F. WEISNEK.
MILK CAN LOCK.
APPLICATION FILED JUNE 28, 1910.
967,694.
Patented Aug. 16, 1910.
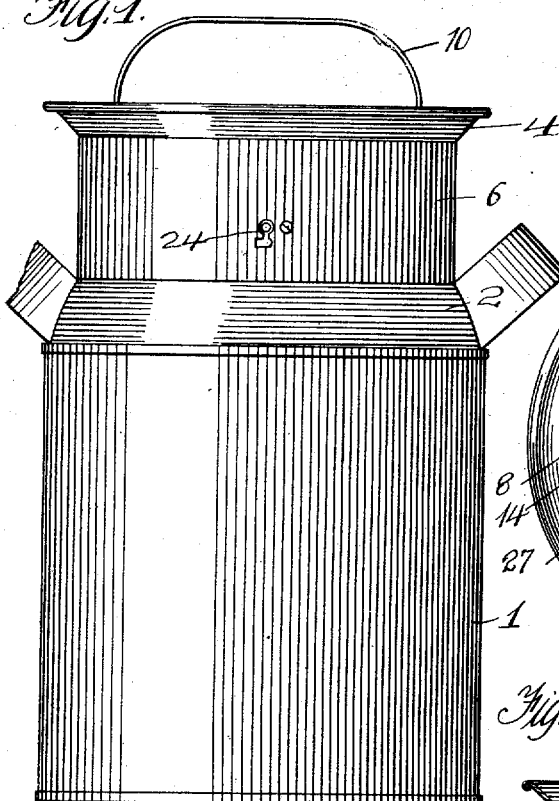
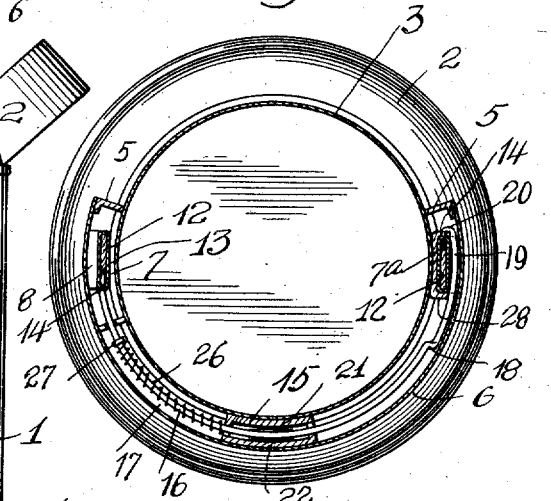
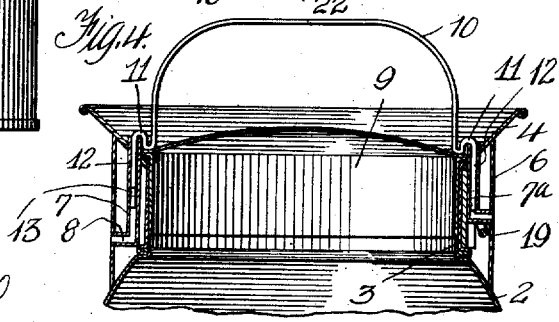
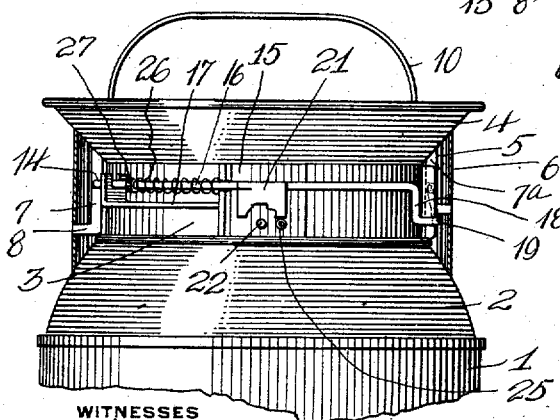
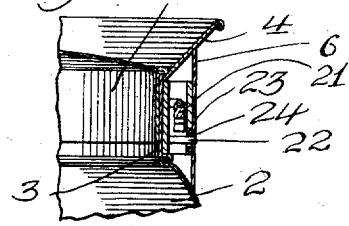
WITNESSES
Samuel Payne
K. K. Butler
INVENTOR
Frank Weisnek
by N. C. Evert Co.
Attorneys.

UNITED STATES PATENT OFFICE.

FRANK WEISNEK, OF CALIFORNIA, PENNSYLVANIA.

MILK-CAN LOCK.

967,694.    Specification of Letters Patent.    Patented Aug. 16, 1910.

Application filed June 28, 1910. Serial No. 569,343.

*To all whom it may concern:*

Be it known that I, FRANK WEISNEK, a citizen of the United States of America, residing at California, in the county of Washington and State of Pennsylvania, have invented certain new and useful Improvements in Milk-Can Locks, of which the following is a specification, reference being had therein to the accompanying drawing.

This invention relates to milk can locks and the invention aims to provide a milk can with a novel lock for positively securing a lid thereon, whereby the contents of the can cannot be surreptitiously removed or tampered with during the transportation of the milk, cream, or contents of the can from the producer to the consumer. To this end, I have devised a lock that is applicable to various kinds of cans or receptacles, simple in construction, durable, easy to manipulate, and highly efficient for the purposes for which it is intended.

The invention will be hereinafter specifically described and then claimed, and reference will now be had to the drawing forming a part of this specification, wherein there is illustrated a preferred embodiment of the invention, but it is to be understood that the structural elements thereof can be varied or changed, as to the size, shape, and manner of assemblage without departing from the scope of the appended claims.

In the drawings: Figure 1 is a side elevation of a milk can in accordance with this invention. Fig. 2 is a horizontal sectional view of the same. Fig. 3 is a side elevation of a portion of the milk can showing the lock casing thereof in section and the locking mechanism in front elevation. Fig. 4 is a vertical cross sectional view of a portion of the milk can, and Fig. 5 is a vertical transverse sectional view of a portion of the same.

In the accompanying drawings the reference numeral 1 denotes a can having a breast or upper reduced end 2 terminating in a cylindrical neck 3 having a funnel-shaped mouth-piece 4. The neck 3 at points approximately diametrically opposed has the outer side thereof provided with vertical ribs 5 and connected to said ribs by rivets, solder, or other fastening means is a lock casing 6, consisting of a strap of metal bent around the neck from one rib to the other, the lock casing having for its bottom wall the breast or reduced end 2 and for its top wall the funnel-shaped mouth-piece 4.

Within the lock casing 6 adjacent to the ends thereof are located vertical keepers or guide casings 7 and 7ª, these keepers or guide casings being diametrically disposed, with the upper ends thereof extending through the funnel-shaped mouth-piece 4, while the lower ends thereof are provided with angular extensions 8 having open ends flush with the outer side of the lock casing 6, whereby water or other matter that might enter the upper ends of the keepers or casings 7 and 7ª will drain out of the open angular ends 8 thereof.

A cylindrical lid 9 is adapted to fit in the neck 3, and said lid is provided with a handle or bail 10 having the ends thereof bent upwardly, as at 11, and then downwardly, as at 12, to provide latches whereby the latches will enter the keepers or guide casings 7 and 7ª as the lid is placed upon the can. The latches are provided with notches 13 and these notches are adapted to register with openings 14 formed in one side wall of each of the guide casings 7 and 7ª, the opening 14 of the guide casing 7 being in the opposite wall from the opening 14 of the guide casing 7ª, for a purpose that will presently appear.

In the lock casing 6 intermediate the guide casings 7 and 7ª is a lock body 15 and extending through said lock body is a curved locking bar 16, one end of said bar extending through a curved guide and support 17, carried by the neck 3 and entering the opening 14 of the guide casing 7, while the opposite end of the locking bar adjacent to the end thereof is bent downwardly, as at 18, outwardly, as at 19, and the end thereof hook-shaped, as at 20 to enter the opening 14 of the guide casing 7ª. The locking bar 16 intermediate the ends thereof and within the lock body 15 is provided with a depending shifting member 21 and directly below this member is a key post 22 carried by the lock body 15 and extending into key openings 23 and 24 formed in the lock body 15 and the neck 3 respectively and adapted to receive a key for shifting the member 21. Within the lock body 15 there is a ward 25 adapted to limit the movement of the key in one direction.

To normally retain the ends of the locking bar in the guide casings 7 and 7ª and the notches 13 of the latches, a coiled compression spring 26 encircles the locking bar directly above the support and guide 17, one end of said compression spring resting against the lock casing 15 while the opposite end bears against a collar 27 mounted upon the locking bar 16.

The guide casing 7ª is provided with a bracket 28 and this bracket guides that end of the locking bar 16 that passes in front of the guide casing 7ª beneath the angular end thereof.

From the foregoing it will be observed that the locking mechanism is located exteriorly of the neck 3 and therefore cannot contaminate the contents of the can.

It is obvious that light and durable metal is used throughout the construction of the milk can lock.

What I claim, is:

1. The combination with a milk can having a neck terminating in a funnel-shaped mouth-piece, a lid adapted to fit in said neck, and a handle carried by said lid, of latches carried by the ends of said handle, a lock casing secured upon the outer side of said neck, oppositely disposed guide casings located in said lock casing and having the upper ends thereof open to receive said latches and the lower ends thereof open to drain said guide casings, said guide casings having openings formed therein, a lock body located in said lock casing, a locking bar movably mounted in said lock body and adapted to have the ends thereof enter the openings of said guide casings and engage said latches, and means in connection with said locking bar whereby said bar can be shifted to release said latches.

2. The combination with a milk can having a neck terminating in a funnel-shaped mouth-piece, a lid adapted to fit in said neck, and a handle carried by said lid, of latches carried by the ends of said handle, a lock casing secured upon the outer side of said neck, oppositely disposed guide casings located in said lock casing and having the upper ends thereof open to receive said latches and the lower ends thereof open to drain said guide casings, said guide casings having openings formed therein, a lock body located in said lock casing, a locking bar movably mounted in said lock body and adapted to have the ends thereof enter the openings of said guide casings and engage said latches, means in connection with said locking bar whereby said bar can be shifted to release said latches, and means in connection with said locking bar for normally holding the ends thereof in engagement with said latches.

3. In a milk can lock, a lid, a handle carried by said lid and having depending latches, open guide casings adapted to receive said latches, a locking bar adapted to have the ends thereof enter said guide casings and engage said latches, and means in connection with said locking bar for normally retaining the ends thereof in engagement with said latches.

In testimony whereof I affix my signature in the presence of two witnesses.

FRANK WEISNEK.

Witnesses:
  RAY FRESHWATER,
  JNO. WRIGHT.